US010891028B2

(12) United States Patent
Shinohara

(10) Patent No.: US 10,891,028 B2
(45) Date of Patent: Jan. 12, 2021

(54) INFORMATION PROCESSING DEVICE AND INFORMATION PROCESSING METHOD

(71) Applicant: Sony Computer Entertainment Inc., Tokyo (JP)

(72) Inventor: Takayuki Shinohara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 507 days.

(21) Appl. No.: 14/915,985

(22) PCT Filed: Apr. 9, 2014

(86) PCT No.: PCT/JP2014/002059
§ 371 (c)(1),
(2) Date: Mar. 2, 2016

(87) PCT Pub. No.: WO2015/040772
PCT Pub. Date: Mar. 26, 2015

(65) Prior Publication Data
US 2016/0210004 A1    Jul. 21, 2016

(30) Foreign Application Priority Data
Sep. 18, 2013 (JP) .................................. 2013-192739

(51) Int. Cl.
*G06F 17/00* (2019.01)
*G06F 3/048* (2013.01)
(Continued)

(52) U.S. Cl.
CPC .......... *G06F 3/0483* (2013.01); *G06F 3/0338* (2013.01); *G06F 3/0485* (2013.01);
(Continued)

(58) Field of Classification Search
CPC ..... G06F 3/0338; G06F 3/0483; G06F 3/0485
(Continued)

(56) References Cited

U.S. PATENT DOCUMENTS 6,314,426 B1 * 11/2001 Martin .................... G05G 9/047
7,120,474 B1 * 10/2006 Sharp .................. H04M 1/0214
455/575.1

(Continued)

FOREIGN PATENT DOCUMENTS

CN    101689200 A    3/2010
CN    102760301 A    10/2012
(Continued)

OTHER PUBLICATIONS

International Preliminary Report on Patentability and Written Opinion for corresponding PCT Application No. PCT/JP2014/002059, 9 pages, dated Mar. 31, 2016.
(Continued)

*Primary Examiner* — Manglesh M Patel
(74) *Attorney, Agent, or Firm* — Matthew B. Dernier, Esq.

(57) ABSTRACT

Methods and apparatus provide for tilting of a joystick. When there is room for scrolling in the tilting direction, a screen is scrolled in the same direction as the tilting direction. When there is no room for scrolling, and a previous or subsequent region continuous with a present display region in the contents of a book is present within double-spread pages at the time point in question, display is switched to the previous or subsequent region. When the previous or subsequent region continuous with the present display region is not present within the double-spread pages, and the tilting direction is parallel with the opening of the pages, a page turning animation is inserted, and the display region is switched. When the tilting direction is not parallel with the opening of the pages, display is directly switched.

8 Claims, 12 Drawing Sheets

(51) Int. Cl.
| | | |
|---|---|---|
| G06F 3/0483 | (2013.01) | |
| G06F 3/0485 | (2013.01) | |
| G06F 3/0338 | (2013.01) | |
| G09G 5/34 | (2006.01) | |
| G06T 13/20 | (2011.01) | |
| G06F 3/0484 | (2013.01) | |
| G06T 13/80 | (2011.01) | |

(52) U.S. Cl.
CPC .......... *G06F 3/04845* (2013.01); *G06T 13/20* (2013.01); *G06T 13/80* (2013.01); *G09G 5/34* (2013.01); *G09G 2354/00* (2013.01); *G09G 2380/14* (2013.01)

(58) Field of Classification Search
USPC .................................................. 715/784, 200
See application file for complete search history.

(56) References Cited

U.S. PATENT DOCUMENTS

| | | | | |
|---|---|---|---|---|
| 7,558,820 B2 * | 7/2009 | Kimoto | A63F 13/12 | 463/29 |
| 7,605,801 B1 * | 10/2009 | Sharp | G06F 3/0338 | 345/156 |
| 8,209,628 B1 * | 6/2012 | Davidson | G06F 3/0487 | 715/790 |
| 8,259,136 B2 * | 9/2012 | Kim | G06F 3/0488 | 345/660 |
| 8,407,608 B1 * | 3/2013 | Franklin | G06F 3/04812 | 715/756 |
| 8,423,293 B2 * | 4/2013 | Kondo | G01C 21/36 | 345/679 |
| 8,434,685 B1 * | 5/2013 | Lewbel | G06F 3/1423 | 235/454 |
| 8,870,654 B2 | 10/2014 | Nakayama | | |
| 9,218,111 B2 | 12/2015 | Kawai | | |
| 9,733,784 B1 * | 8/2017 | King | G06F 3/0483 | |
| 2002/0118230 A1 * | 8/2002 | Card | G06F 3/04815 | 715/776 |
| 2006/0123362 A1 * | 6/2006 | Keely | G06F 1/1626 | 715/857 |
| 2007/0161400 A1 * | 7/2007 | Sharp | G06F 3/0234 | 455/550.1 |
| 2008/0222552 A1 * | 9/2008 | Batarseh | G09B 5/02 | 715/776 |
| 2009/0300539 A1 * | 12/2009 | Hendricks | G06F 17/2235 | 715/779 |
| 2010/0188335 A1 | 7/2010 | Priddle | | |
| 2011/0050594 A1 * | 3/2011 | Kim | G06F 3/04847 | 345/173 |
| 2011/0063404 A1 * | 3/2011 | Raffle | H04N 7/147 | 348/14.08 |
| 2011/0242007 A1 * | 10/2011 | Gray | G06F 3/0488 | 345/173 |
| 2011/0314428 A1 * | 12/2011 | Yoo | G06F 3/04883 | 715/863 |
| 2012/0042279 A1 * | 2/2012 | Naderi | G06F 3/04855 | 715/786 |
| 2012/0054822 A1 * | 3/2012 | Dvorak | G06F 21/10 | 726/1 |
| 2012/0066591 A1 * | 3/2012 | Hackwell | G06F 3/0483 | 715/702 |
| 2012/0089938 A1 * | 4/2012 | Homma | G06F 3/0485 | 715/776 |
| 2012/0131463 A1 * | 5/2012 | Lefler | G06F 3/0483 | 715/730 |
| 2012/0149001 A1 * | 6/2012 | Dohring | G09B 7/06 | 434/365 |
| 2012/0154431 A1 * | 6/2012 | Fram | G06F 3/0338 | 345/619 |
| 2012/0182310 A1 * | 7/2012 | Okada | G06F 3/0483 | 345/619 |
| 2012/0188154 A1 * | 7/2012 | Lee | G06F 1/1694 | 345/156 |
| 2012/0254792 A1 * | 10/2012 | Husoy | G06F 3/0481 | 715/782 |
| 2012/0287053 A1 * | 11/2012 | Bos | G06F 3/03547 | 345/173 |
| 2013/0178293 A1 | 7/2013 | Nakayama | | |
| 2013/0198678 A1 * | 8/2013 | Lee | G06F 3/0483 | 715/776 |
| 2013/0198686 A1 | 8/2013 | Kawai | | |
| 2013/0229371 A1 * | 9/2013 | Lee | G06F 3/0414 | 345/173 |
| 2013/0232439 A1 * | 9/2013 | Lee | G06F 3/0483 | 715/776 |
| 2013/0250344 A1 * | 9/2013 | Merriam | G06F 3/1208 | 358/1.15 |
| 2013/0268851 A1 * | 10/2013 | Joo | G06F 40/166 | 715/255 |
| 2014/0053111 A1 * | 2/2014 | Beckman | G06F 3/04812 | 715/856 |
| 2014/0059425 A1 * | 2/2014 | Park | G06F 3/0483 | 715/251 |
| 2014/0149905 A1 * | 5/2014 | Woo | G06F 3/0485 | 715/768 |
| 2014/0160168 A1 * | 6/2014 | Ogle | G09G 5/34 | 345/660 |
| 2014/0225932 A1 * | 8/2014 | Ikeda | G06F 3/0483 | 345/661 |
| 2014/0281936 A1 * | 9/2014 | Wallis | G06F 3/0483 | 715/251 |
| 2014/0298164 A1 * | 10/2014 | Terayoko | G06F 17/211 | 715/243 |
| 2014/0337791 A1 * | 11/2014 | Agnetta | G06F 3/0481 | 715/784 |
| 2014/0365854 A1 * | 12/2014 | Karunamuni | G06F 3/0482 | 715/205 |
| 2014/0380247 A1 * | 12/2014 | Tecarro | G06F 3/0482 | 715/863 |
| 2015/0007092 A1 * | 1/2015 | Park | G06F 1/1694 | 715/776 |
| 2015/0145800 A1 * | 5/2015 | Fukui | G06F 3/017 | 345/173 |
| 2015/0149950 A1 * | 5/2015 | Bennett | G06F 1/169 | 715/776 |

FOREIGN PATENT DOCUMENTS

| | | |
|---|---|---|
| CN | 103143167 A | 6/2013 |
| JP | 59180628 A | 10/1984 |
| JP | 2005202062 A | 7/2005 |
| JP | 2010277456 A | 12/2010 |
| JP | 2012063940 A | 3/2012 |
| WO | 2013084522 A1 | 6/2013 |

OTHER PUBLICATIONS

International Search Report for corresponding PCT Application No. PCT/JP2014/002059, 2 pages, dated May 13, 2014.

Office Action for corresponding CN Application No. 201480050128.7, 13 pages, dated Dec. 12, 2017.

* cited by examiner (a)

(b)

(a)

(b)

(c)

INFORMATION PROCESSING DEVICE AND INFORMATION PROCESSING METHOD

TECHNICAL FIELD

The present invention relates to an information processing device that controls display screen according to a manual operating input by a user, and an information processing method.

BACKGROUND ART

Information processing devices such as portable type game machines, PDAs (Personal Digital Assistants), and the like have spread. Recently, many information processing devices have been equipped with a communicating function, and multifunctional type information processing devices into which functions of a mobile telephone, a PDA, and the like are integrated into one, such as smart phones, have also appeared. Such an information processing device includes a high-capacity memory and a high-speed processor, so that a user can enjoy various applications by installing application programs (see for example PTL 1).

Because such an environment is provided, various kinds of contents such as electronic books, moving images including video and the like, Web pages, music, and the like are obtained via a network or a recording medium and personally enjoyed on an information processing device on a daily basis. In addition, viewing with high image quality has become possible irrespective of the size of the device such as a personal computer, a portable terminal, or the like. An image processing technology has thus become indispensable in daily life.

CITATION LIST

Patent Literature

[PTL 1] U.S. Pat. No. 7,558,820

SUMMARY

Technical Problem

In a case of viewing contents including many pieces of character information and image information over a large number of pages as in an electronic book, rules for movement between pages and a viewing direction within a page, for example, are unique. Thus, as compared with a case where a Web page is simply displayed, for example, contrivance is necessary for a display method and an operating method. A technology is desired which makes it possible to view contents with a feeling close to that of actually reading a book and with natural operations even when using an information processing device.

The present invention has been made in view of such problems. It is an object of the present invention to provide a technology that can display contents with excellent operability.

Solution to Problem

A mode of the present invention relates to an information processing device. The information processing device is an information processing device for displaying contents constituted of a plurality of pages according to user operation, the information processing device including: an operation receiving section receiving an operation of tilting a joystick; and a display screen control section changing a display screen in a display device according to the operation of tilting the joystick, the operation being received by the operation receiving section; the display screen control section making the changing of the display screen different according to a tilting direction of the joystick and a position of a display region within a page at a time point in question.

Another mode of the present invention relates to an information processing method. The information processing method is an information processing method performed by an information processing device, the information processing device displaying contents constituted of a plurality of pages on a display device according to user operation, the information processing method including: a step of receiving an operation of tilting a joystick; and a step of changing a display screen in the display device according to the received operation of tilting the joystick; the step of changing the display screen making the changing of the display screen different according to a tilting direction of the joystick and a position of a display region within a page at a time point in question.

It is to be noted that arbitrary combinations of the above constituent elements as well as modes realized by converting expressions of the present invention between a method, a device, a system, a computer program, a recording medium on which the computer program is recorded, and the like are also effective as modes of the present invention.

Advantageous Effect of Invention

According to the present invention, an information processing technology can be realized which displays contents with excellent operability and excellent accessibility.

DESCRIPTION OF EMBODIMENT

Description will first be made of an example of external constitution and an example of circuit configuration of an information processing device according to a present embodiment. However, the information processing device shown in the following is an example, and may be another kind of electronic apparatus or terminal device.

Figure 1:
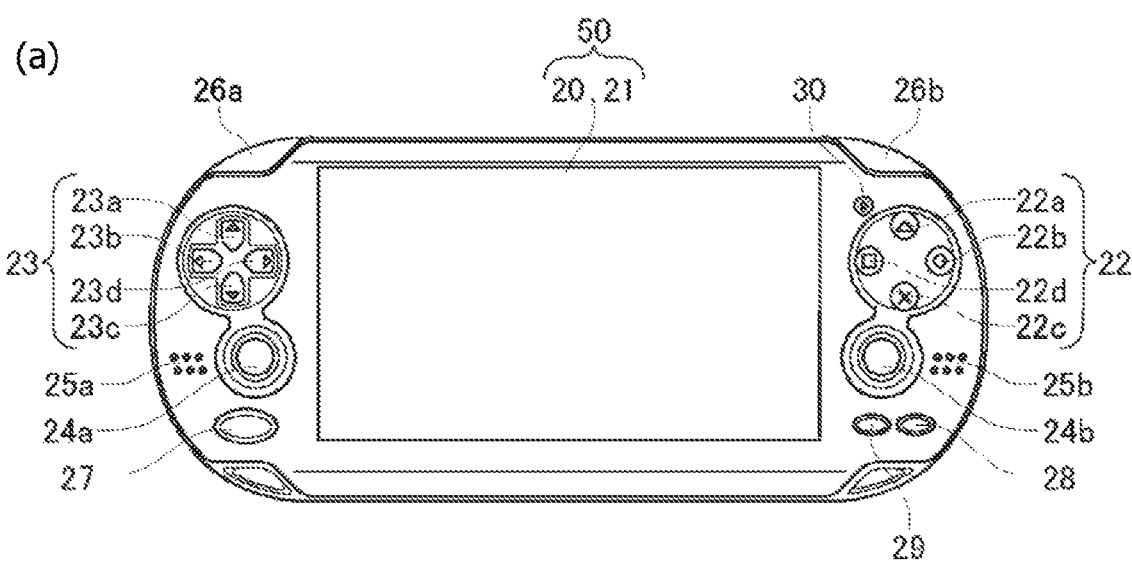
FIG. 1(a) is a diagram showing a front surface of an information processing device in a present embodiment.
FIG. 1(b) is a diagram showing a back surface of the information processing device.
Figure 1:
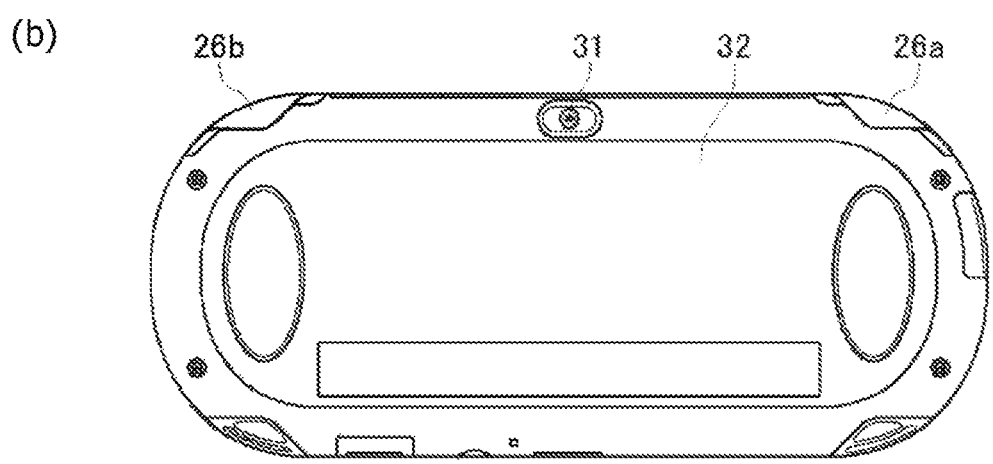

FIG. 1(a) shows the front of an information processing device 10. The information processing device 10 is formed in a horizontally long housing. The right and left sides of the housing, which are held by a user, have an arc-shaped outer surface. On the front surface of the information processing device 10 is provided a rectangular touch panel 50. The touch panel 50 includes a display device 20 and a front touch pad 21 that is transparent and covers the surface of the display device 20. The display device 20 is an organic EL (Electro-Luminescence) panel, and displays an image. Alternatively, the display device 20 may be display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred to collectively). The buttons are each located at the vertices of a rhombus. At the left of the touch panel 50 are provided an up key 23a, a left key 23b, a down key 23c, and a right key 23d (hereinafter referred to as "directional keys 23" when referred to collectively). A user can input eight directions (up, down, left, and right directions, and diagonal directions) by manipulating the directional keys 23.

Below the directional keys 23, a left stick 24a is provided, and below the control buttons 22, a right stick 24b is provided. A user tilts the left stick 24a or the right stick 24b (hereinafter referred to as "joysticks 24" when referred to collectively) so as to input the direction and the degree of the tilt. On the upper left and upper right of the housing an L button 26a and an R button 26b are provided, respectively. The control buttons 22, the directional keys 23, the joysticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (hereinafter referred to as "speakers 25" when referred to collectively) that output sound are provided respectively. Further, below the left stick 24a is provided a HOME button 27 and below the right stick 24b are provided a START button 28 and a SELECT button 29.

FIG. 1(b) shows the rear of the information processing device 10. On the rear surface of the information processing device 10, a rear camera 31 and a rear touch pad 32 are provided. In a similar manner as that of the front touch pad 21, the rear touch pad 32 is configured as a multi-touch pad. Two cameras and two touch pads are mounted on the information processing device 10 at the front and rear surfaces.

Figure 2:
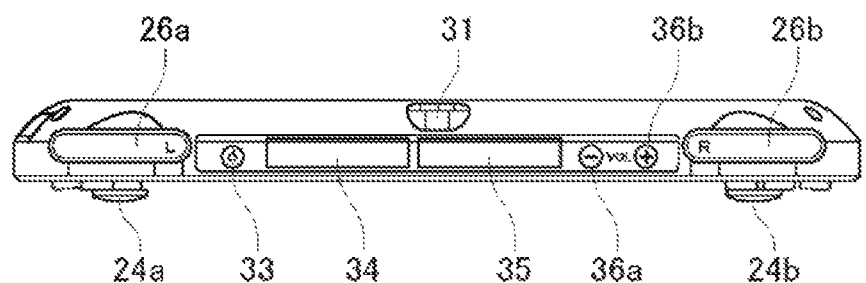
FIG. 2(a) is a diagram showing a top surface of the information processing device in the present embodiment.
FIG. 2(b) is a diagram showing an undersurface of the information processing device.
FIG. 2(c) is a diagram showing a left side surface of the information processing device.
Figure 2:
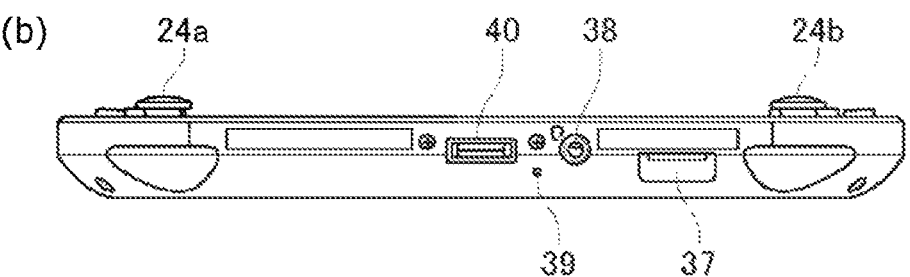
Figure 2:
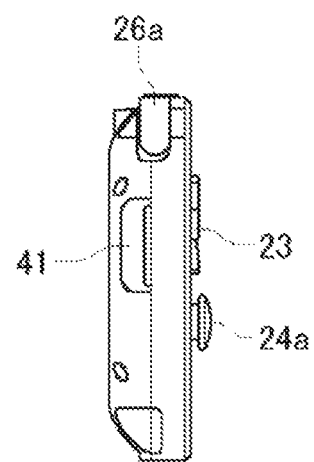

FIG. 2(a) shows the top view of the information processing device 10. As described previously, at the left and right edges of the top surface of the information processing device 10 are provided the L button 26a and the R button 26b, respectively. At the right of the L button 26a, a power button 33 is provided. A user turns the power on or off by pressing the power button 33. The information processing device 10 is provided with a power control function that makes a transition to a suspend state if a time period during which no operation is input (non-operation time period) lasts for a predetermined time period. If the information processing device 10 enters the suspend state, a user can return the information processing device 10 from the suspend state to an awake state by pressing the power button 33.

A game card slot 34 is a slot for inserting a game card. The figure shows the game card slot 34 that is covered by a slot cover. In the vicinity of the game card slot 34, an LED lamp may be provided that blinks when a game card is accessed. An accessory terminal 35 is a terminal for connecting a peripheral device (accessory). The figure shows the accessory terminal 35 that is covered by a terminal cover. Between the accessory terminal 35 and the R button 26b are provided a minus button 36a and a plus button 36b for adjusting volume.

FIG. 2(b) shows the bottom view of the information processing device 10. A memory card slot 37 is a slot for inserting a memory card. The figure shows the memory card slot 37 that is covered by a slot cover. On the bottom surface of the information processing device 10 are provided an audio input and output terminal 38, a microphone 39, and a multi-use terminal 40. The multi-use terminal 40 supports USB (Universal Serial Bus), and can be connected to another device via a USB cable.

FIG. 2(c) shows the left side view of the information processing device 10. On the left side face of the information processing device 10 is provided a SIM card slot 41, which is a slot for inserting a SIM card.

Figure 3:
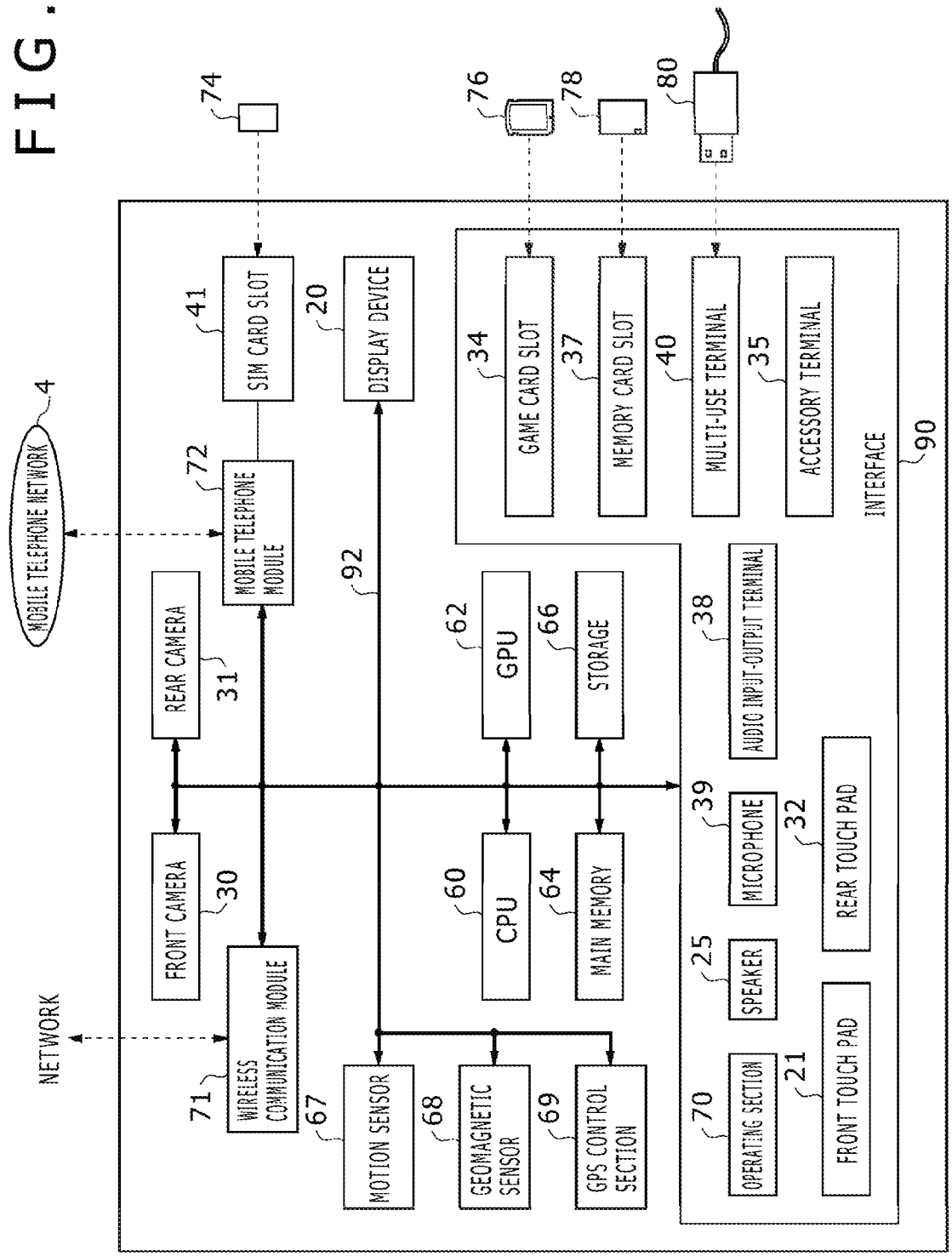
FIG. 3 is a diagram showing a circuit configuration of the information processing device in the present embodiment.

FIG. 3 shows the circuit configuration of the information processing device 10. Respective elements thereof are connected to one another via a bus 92. A wireless communication module 71 includes a wireless LAN module that complies with a communication standard such as IEEE802.11b/g or the like. The wireless communication module 71 is connected to an external network such as the Internet or the like via a wireless access point or the like. The wireless communication module 71 may be provided with a Bluetooth (registered trademark) protocol communication function. A mobile phone module 72 supports the 3rd Generation digital mobile phone system that complies with the IMT-2000 (International Mobile Telecommunication 2000) defined by the ITU (International Telecommunication Union). The mobile phone module 72 is connected to a mobile phone network 4. Inserted in the SIM card slot 41 is a SIM card 74, on which a unique ID number for identifying the telephone number of a mobile phone is stored. As a result of the SIM card 74 being inserted in the SIM card slot 41, the mobile phone module 72 can communicate with the mobile phone network 4.

A CPU (Central Processing Unit) 60 executes a program or the like loaded onto a main memory 64. A GPU (Graphics Processing Unit) 62 performs calculations required for image processing. The main memory 64 is configured with RAM (Random Access Memory) or the like, and stores a program and/or data to be used by the CPU 60. A storage 66 is configured with a NAND-type flash memory or the like, and is utilized as a built-in auxiliary storage device.

A motion sensor 67 detects the movement of the information processing device 10, and a geomagnetic sensor 68 detects earth-geomagnetism in each of the three-axis directions. A GPS control section 69 receives signals from the GPS satellites and calculates the current position. The front camera 30 and the rear camera 31 capture an image and input the image data thereof. The front camera 30 and the rear camera 31 are configured with a CMOS image sensor (Complementary Metal Oxide Semiconductor Image Sensor).

The display device 20 is an organic EL display device, and provided with a light emitting element which emits light when a voltage is applied between a negative electrode and a positive electrode. During power saving mode, by reducing the voltage to be applied between the electrodes to a level below that of a normal mode, the display device 20 can be turned into a low-light state. Thus, the power consumption can be restricted. Alternatively, the display device 20 may be a liquid crystal display device provided with a backlight. During power saving mode, by reducing the light intensity of the backlight, the liquid crystal display device can be turned into a low-light state. Thus, the power consumption can be restricted.

In an interface 90, an operating section 70 includes various manipulation means provided in the information processing device 10. More specifically, the operating section 70 includes the control buttons 22, the directional keys 23, the joysticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speakers 25 output sound generated by respective functions of the information processing device 10. The microphone 39 inputs sound from around the information processing device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

The information processing device 10 in the present embodiment not only performs game and communicating functions but also functions as a portable terminal for enjoying various kinds of contents such as electronic books, video, music, and the like. The electronic data of the contents is downloaded from a content providing server via the network, and stored in the storage 66. Alternatively, the electronic data of the contents is stored in the memory card 78 inserted in the memory card slot 37.

Then, the electronic data of the contents is read in response to an output request from the user, and subjected to decoding processing or the like as appropriate. The electronic data of the contents is thereby output from the display device 20 and the speaker 25. In the present embodiment, attention will be directed mainly to a method of operating the display screen using the joystick 24 of the operating section 70 in viewing an electronic book. In the processing of displaying an electronic book selecting screen and an electronic book viewing screen, processing and configurations to which ordinary technologies can be applied will be omitted from description as appropriate. It is to be noted that the contents set as a processing object by the present embodiment are not limited to electronic books, but may be games, Web pages, or the like as long as the contents include display of documents constituted of a plurality of pages and images. In addition, the present embodiment is not limited to completed contents, but is also applicable to the display of electronic data such as documents, images, or the like being created by a user.

Figure 4:
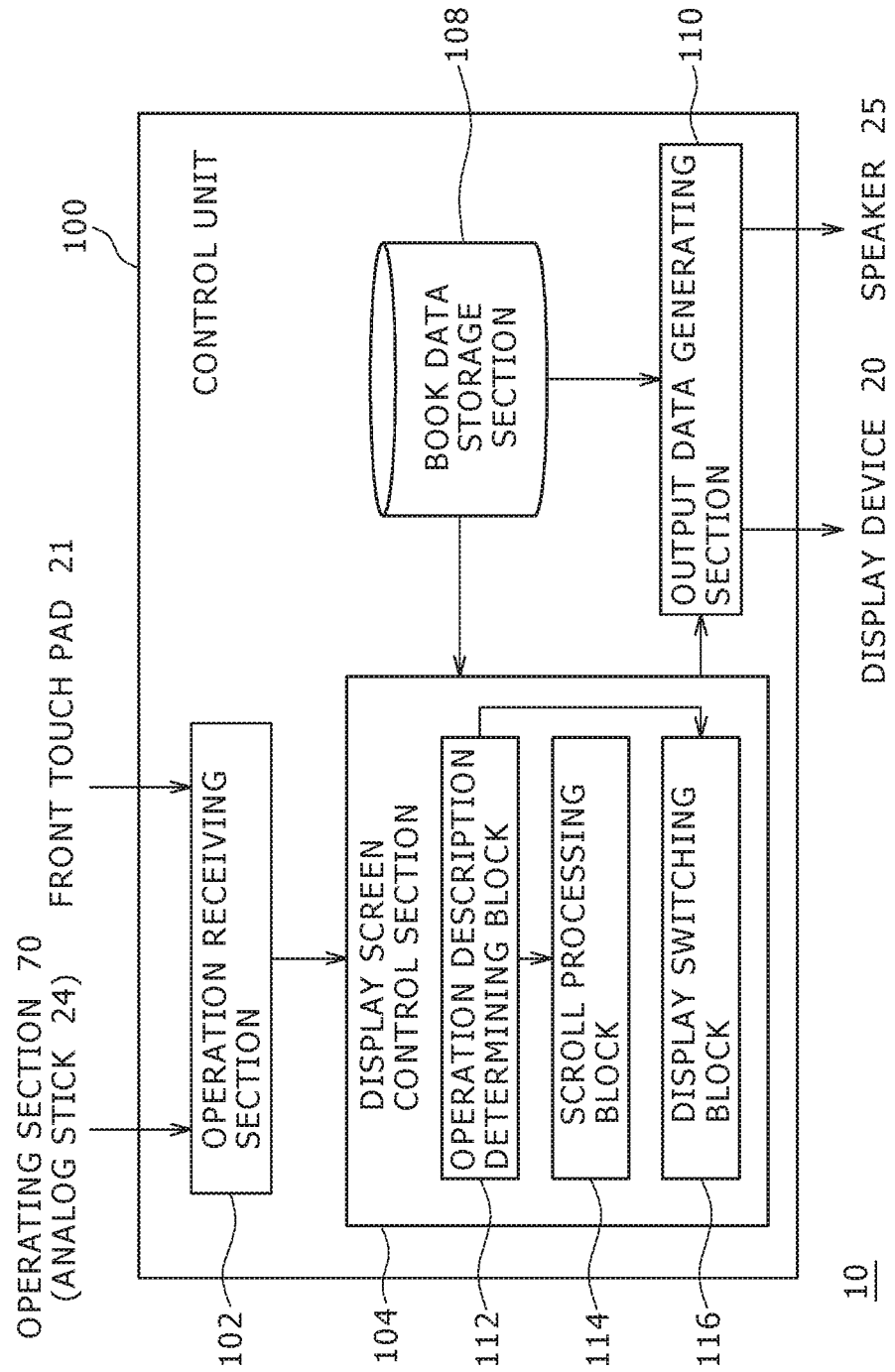
FIG. 4 is a diagram showing functional blocks of the information processing device in the present embodiment.

FIG. 4 shows functional blocks of the information processing device 10. In this figure, functions implemented by the CPU 60, the GPU 62, the main memory 64, and the storage 66 in FIG. 3, in particular, are shown as a control unit 100. Each of the functional blocks included in the control unit 100 can be configured by the CPU 60, the GPU 62, the main memory 64, the storage 66, and the like in terms of hardware, as described above, and is implemented by a program loaded from various kinds of storage devices or a loaded recording medium within the information processing device 10 into the main memory 64, for example, in terms of software. Hence, it is to be understood by those skilled in the art that these functional blocks can be implemented in various forms by only hardware, only software, or a combination of hardware and software, and are not limited to any one of the forms.

The control unit 100 includes: an operation receiving section 102 receiving information related to operation input by a user; a book data storage section 108 storing data of electronic books; a display screen control section 104 controlling pages and a region to be displayed; and an output data generating section 110 generating a display image and output audio.

The operation receiving section 102 receives a signal indicating the description of an operation performed on the information processing device 10 by the user from operating means such as the operating section 70 including the joystick 24, the front touch pad 21, or the like, and supplies the signal to the display screen control section 104. The book data storage section 108 stores, in advance, the data of electronic books as display objects. When the user performs an operation of selecting one book from an electronic book selecting screen displayed on the display device 20 via the operating section 70, for example, information on the operation is notified from the operation receiving section 102 to the display screen control section 104, and the display screen control section 104 recognizes the electronic book as a display object. At this time, in terms of hardware, the corresponding electronic data is loaded from the storage 66 or the memory card 78 into the main memory 64 in FIG. 3.

The data of the electronic book includes for example image data for each page and additional data such as bibliographic information and the like.

The display screen control section 104 controls the display screen of each page of the electronic book according to the user operation received by the operation receiving section 102. As described above, only functions for realizing page switching and movement of a display region using the joystick 24 of the operating section 70 are illustrated herein. However, other operating means may be used for user operation as appropriate. For example, the L-button 26a and the R-button 26b may also be able to be used for page switching, and the front touch pad 21 may also be able to be used for movement of the display region. Thus enabling the same functions to be operated by a plurality of means allows the user to properly use operating means according to conditions at the time or the preferences of the user.

The display screen control section 104 includes an operation description determining block 112, a scroll processing block 114, and a display switching block 116. In the present embodiment, a plurality of operations such as free scrolling of the display screen, switching of a page or a display region, page turning, and the like can be performed by one joystick 24. For this purpose, the operation description determining block 112 determines the description of an operation intended by the user on the basis of the tilting direction of the joystick 24 and the position of a region being displayed within a page, and determines following processing.

When the operation description determining block 112 determines that the operation is scrolling, the scroll processing block 114 derives a temporal change in the display region from the tilting direction and amount of tilting of the joystick 24. For example, the coordinates of four corners of the display region in a two-dimensional space representing a page or the like are obtained for each predetermined time step determined from the frame rate of the display device 20 or the like.

When the operation description determining block 112 determines that the operation is switching of the display region, the display switching block 116 identifies a page and a region after the switching. The switching of the display region includes a case of switching of display to another region within a same page or two double-spread pages displayed side by side and a case of switching of display to a region within a page that is set as a new display object by page turning.

Both of the cases are different from the scroll processing performed by the scroll processing block 114 in that neither of the cases includes continuous movement to the region after the switching. The display region after the switching is basically a previous or subsequent region continuous with the display region before the switching in the contents of the book. For example, when the whole of a second page of the book is displayed before the switching, the whole of a first page or the whole of a third page is displayed after the switching. When the second half portion of the second page is displayed before the switching, the first half portion of the second page or the first half portion of the third page is displayed after the switching. This makes it possible to read the contents forward or reread the previous part faster than scrolling.

Figure 5:
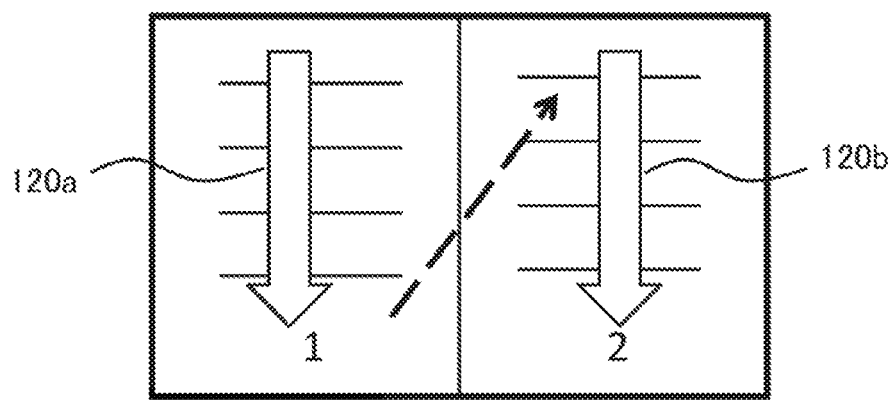
FIG. 5 is a diagram showing an example of a direction in which contents of an electronic book progress, the direction being identified by a display switching block in the present embodiment.

In which of the forward direction and the backward direction to perform switching is determined according to the position of the display region and the tilting direction of the joystick 24 at the time point in question. In order to identify the regions continuous with the display region before the switching, the display switching block 116 identifies, in advance, the direction in which the contents of the electronic book as a display object progress from the data of the electronic book. FIG. 5 shows an example of the direction in which the contents of the electronic book progress, the direction being identified by the display switching block 116. As shown in the figure, in a basic case of displaying two double-spread pages in a horizontally written left-bound book, a direction from the top to the bottom of the left page (arrow 120a) and a direction from the top to the bottom of the right page (arrow 120b) are identified.

The direction in which the contents progress differs depending on the kind of the book, a language being used, and the like. Accordingly, the display switching block 116 may read these pieces of information supplied as additional data of the electronic book and determine the direction, or may register information related to directions in correspondence with categories of books or the like in advance and select the direction according to the bibliographic information of the electronic book. Information ultimately identified by the display switching block 116 on the basis of the direction is a page after the switching and the coordinates of four corners of the display region after the switching in the two-dimensional space representing the page or the like. The information related to the temporal change in the display region which temporal change is determined by the scroll processing block 114 and the information related to the page and the region after the switching, the page and the region after the switching being identified by the display switching block 116, are each notified to the output data generating section 110.

On the basis of the notified information, the output data generating section 110 reads and decodes the image data of the page as a display object from the book data storage section 108 as required, and generates a display image formed of the display region on the page. In a case where display is based on two double-spread pages, an image in which images of the respective pages are horizontally connected to each other as a set of two pages is generated, and thereafter an image of the display region is extracted. Quick display switching can be performed by retaining the once decoded page in an internal memory and reusing the page.

When page turning is necessary, that is, when display is switched to a page preceding or following the two double-spread pages being displayed, the output data generating section 110 inserts a page turning animation during the page switching. At this time, a page turning sound effect may be generated in synchronism with the animation. The data of the generated image and the generated sound effect is output to the display device 20 and the speaker 25 in appropriate timing. A mode can therefore be realized in which the image changes or the sound effect is produced in response to an operation.

Figure 6:
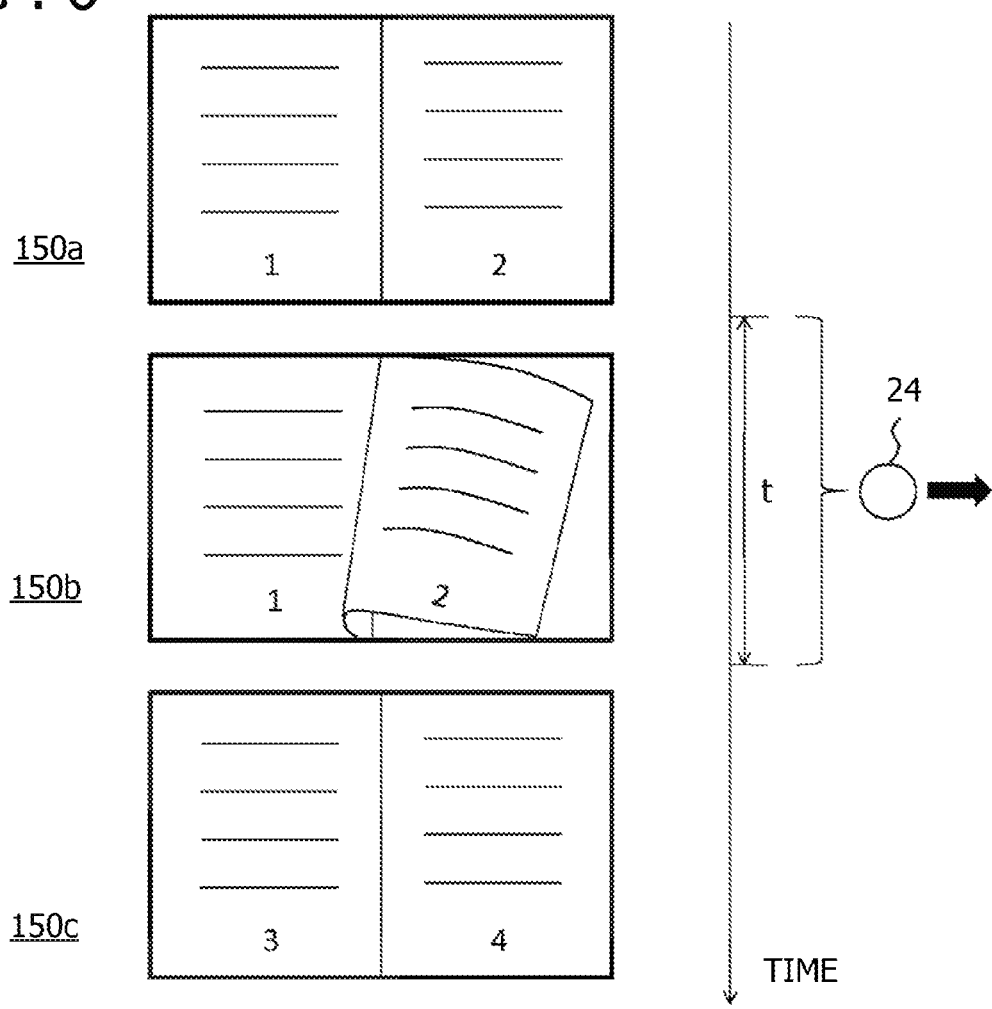
FIG. 6 is a diagram showing an example of changes in an electronic book viewing screen displayed in the present embodiment.

Description will next be made of a concrete example in which scrolling and display region changing operation are realized by the joystick 24. Incidentally, in a case where the joystick 24 is provided on the left and the right as in the case of the information processing device 10 shown in FIG. 1, it suffices to use one of the joysticks. FIG. 6 shows an example of changes in an electronic book viewing screen displayed in the present embodiment. In the example of the figure, two double-spread pages are displayed on one screen. For example, a screen 150a in a top row simultaneously displays a first page on a left side and a second page on a right side. In a case where viewing is performed in a state in which the whole of the two double-spread pages remains thus displayed, display needs to be switched to two double-spread pages preceding or following the two displayed double-spread pages by the joystick 24.

Accordingly, tilting the joystick 24 to one of the left and the right is enabled to effect turning of the page present in the tilting direction and display of the two preceding or following double-spread pages. For example, when the joystick 24 is tilted to the right side in the state in which the screen 150*a* is displaying the two double-spread pages, the page on the right side is turned, and a third page and a fourth page as the next two double-spread pages are displayed (screens 150*b* and 150*c*). On the right side of the figure, the shape of the joystick 24 as viewed from above is represented by a circle, and the tilting direction as viewed from the user is indicated by a black arrow. The same is true for subsequent figures.

The operation and display changes shown in the figure progress as follows in detail. First, during a period during which the joystick 24 is tilted to the right side, as shown on the screen 150*b*, the page on the right side which page is to be turned is bent, whereby a half turned state in which the page is slightly turned is displayed. At this time, an amount by which the page is turned or, in turn, an amount by which the next double-spread page is seen, may be changed according to an amount of tilting of the joystick 24. In this case, an amount of turning when the amount of tilting is a maximum is determined in advance, and the ratio of an actual amount of tilting to the maximum amount of tilting is converted into the ratio of an amount of turning.

When the joystick 24 is returned to a neutral state, that is, the amount of tilting is changed to zero from the state in which the joystick 24 is tilted in the above-described manner and in which the page is slightly turned, as shown on the screen 150*c*, the page is turned completely, and the third page and the fourth page as the next two double-spread pages are displayed. At this time, a time t from a start of tilting of the joystick 24 to the return of the joystick 24 to the neutral state is compared with a predetermined threshold value (hereinafter referred to as a "tilt time limit"), and whether or not to perform page turning is determined according to a result of the comparison.

Specifically, when an actual tilt time t is within the tilt time limit, page turning is performed as in the case of the screen 150*c*. On the other hand, when the tilt time t has exceeded the tilt time limit, the page turning operation is determined to be invalid, and display is returned to the original screen 150*a*. Such a configuration can slightly turn a page to provide a glimpse of a next page, and give the user room to accordingly determine whether or not turn the page. In general, when page turning is determinate from the beginning, there is a strong possibility of a quick operation, and when the user is undecided or performs an erroneous operation, there is a strong possibility of a slow operation. When whether or not to perform page turning is determined according to the tilt time of the joystick 24, a natural operation matching such characteristics can be realized.

Figure 7:
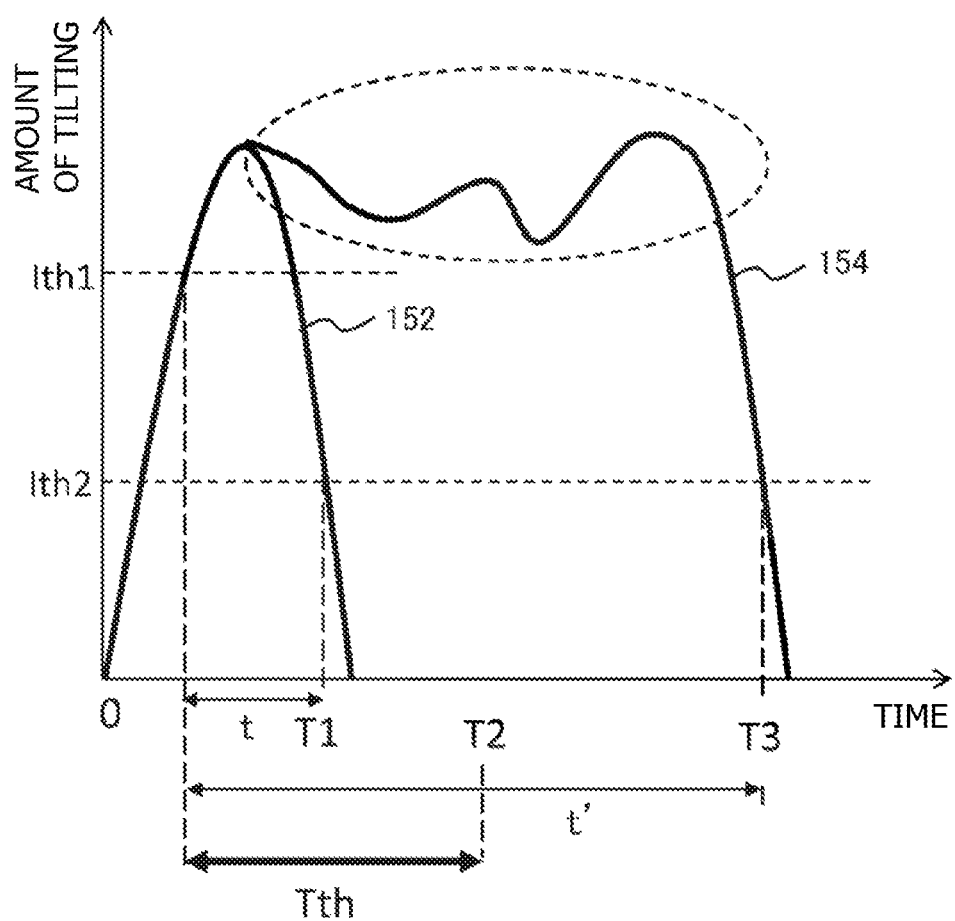
FIG. 7 is a diagram showing an example of temporal changes in an amount of tilting and timing of determining whether page turning is valid/invalid in the present embodiment.

FIG. 7 shows an example of temporal changes in the amount of tilting and timing of determining whether page turning is valid/invalid. In the figure, an axis of ordinates indicates the amount of tilting of the joystick 24, and an axis of abscissas indicates time from a start of tilting. The figure shows temporal changes 152 and 154 in the amount of tilting in two patterns. For the amount of tilting, a first threshold value lth1 is provided to determine that the user is intentionally tilting the joystick 24, and a second threshold value lth2 is provided to determine that the user has intentionally returned the joystick 24 to the neutral state. Then, a tilt time from a point in time that the amount of tilting exceeds the first threshold value lth1 to a point in time that the amount of tilting becomes equal to or smaller than the second threshold value lth2 is set as an actual tilt time, and the actual tilt time is compared with a tilt time limit Tth. Whether page turning is valid/invalid is thereby determined.

In the case of the temporal change 152 in the amount of tilting, a tilt time t is within the tilt time limit Tth. Thus, the page turning operation is determined to be valid in timing "T1" in which the amount of tilting becomes equal to or smaller than the second threshold value lth2, and page turning display is made. On the other hand, in the case of the temporal change 154 in the amount of tilting, a tilt time t' exceeds the tilt time limit Tth, and therefore the page turning operation is determined to be invalid. In this case, the determination that the page turning operation is invalid is made in timing "T2" in which the tilt time limit Tth has passed, and thereafter a half turned state is continued while an amount of page turning is changed according to changes in the amount of tilting of the joystick 24 (for example changes within a dotted line ellipse). Then, display is returned to the original state in timing "T3" in which the amount of tilting becomes equal to or smaller than the second threshold value lth2. Alternatively, the determination that the page turning operation is invalid may also be made in timing "T3."

As the tilt time limit Tth, a time allowing a determination taking the intention of the user into consideration is determined by experiment or the like. When the tilt time limit Tth is set at 0.5 seconds, for example, the user himself/herself can perform control as to whether the page turning operation is valid/invalid by performing a natural operation without the operation being determined to be invalid even when the operation is performed, or without display being switched even when the operation is desired to be determined invalid. The same is true for the first threshold value lth1 and the second threshold value lth2 for the amount of tilting. An unintended page turning state is prevented from occurring by setting amounts of tilting equal to or smaller than the first threshold value lth1 as a dead band in which the tilting is not reflected in display. After the first threshold value lth1 is exceeded, the amount of turning is changed according to the amount of tilting. This can add a sense of realism in turning a page by a tilting operation.

Figure 8:
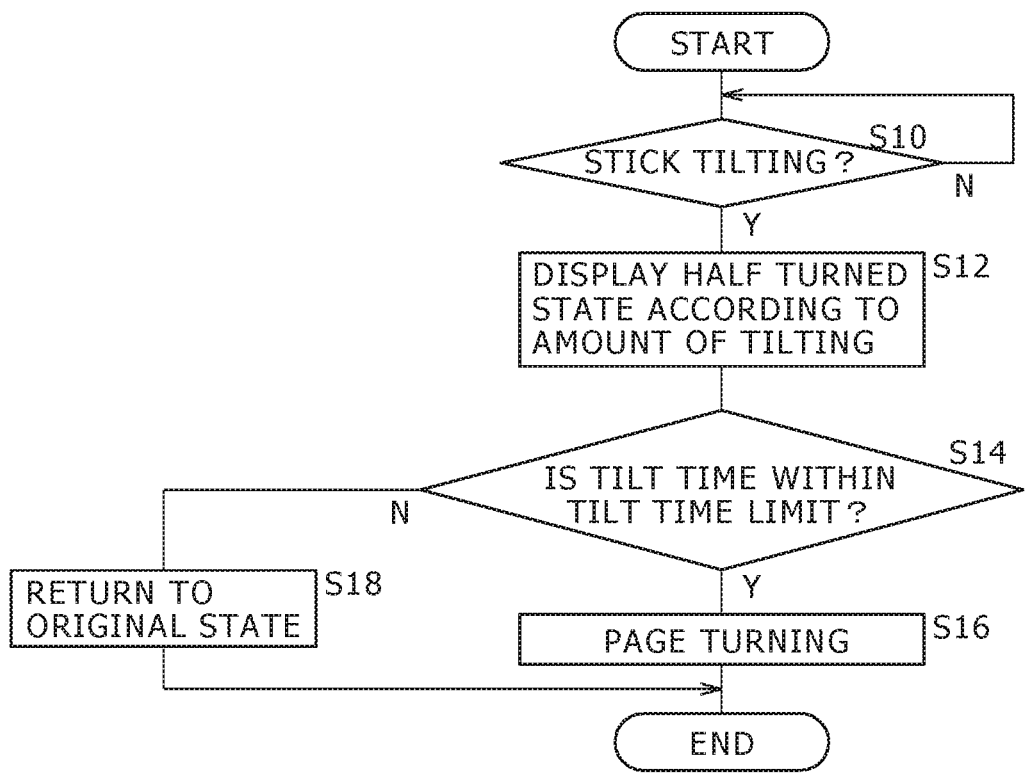
FIG. 8 is a flowchart showing a processing procedure for realizing page turning operation in the present embodiment.

Description will next be made of operation of the information processing device 10 for realizing screen changes as described above. FIG. 8 is a flowchart showing a processing procedure for realizing page turning operation in the present embodiment. First, the operation description determining block 112 obtains information related to the amount of tilting and tilting direction of the joystick 24 from the operation receiving section 102, and monitors whether or not the amount of tilting has exceeded the first threshold value lth1 (S10).

Incidentally, as will be described later, when a part of two double-spread pages are displayed, the operation description determining block 112 also determines whether a scrolling operation or a display region changing operation is to be performed on the basis of the position of the display region within the pages and the tilting direction of the joystick 24. In the flowchart of FIG. 8, a case where the whole of two double-spread pages is displayed as shown in FIG. 6 is illustrated, and therefore such determination processing is omitted.

While no tilting is detected, the processing waits in that state (N in S10). When tilting is detected (Y in S10), on the other hand, the operation description determining block 112 notifies the display switching block 116 to that effect. The display switching block 116 converts the amount of tilting into an amount of turning of a page as described above, and requests the output data generating section 110 to generate an image of a half turned state in which the page present in the tilting direction is turned by the amount of turning. Incidentally, the "tilting direction" reflected in display in this case is one of the left and right directions. Thus, an angle range in which it can be determined that the tilting direction is "left" and an angle range in which it can be determined that the tilting direction is "right" are set for the tilting direction of the joystick with a certain operation error taken into consideration. The same is true for determination of an upward direction or a downward direction to be described later.

In addition, as will be described later, the present embodiment displays an image so as to deal with both of a case where the information processing device 10 is held in a landscape orientation and a case where the information processing device 10 is held in a portrait orientation. That is, the display image is rotated according to the holding orientation of the information processing device so that the top and bottom of the display device as viewed from the user and the top and bottom of the displayed page coincide with each other. At this time, the setting of an angle range on the information processing device for determining that tilting is performed in each of tilting directions such as "left," "right," and the like is rotated according to the holding orientation of the information processing device so that the tilting direction of the joystick also coincides with the upward, downward, left, or right direction as viewed from the user. Incidentally, the descriptions of a "left side," a "right side," an "upper side," and a "lower side" related to the tilting direction of the joystick 24 in the following description represent directions as viewed from the user, and, to be exact, mean an angle range set for each direction with the holding orientation of the information processing device also taken into consideration.

The output data generating section 110 sequentially generates a display image of a state in which the corresponding page is turned by the amount of turning reflecting the amount of tilting, and displays the display image on the display device 20. An animation in which the amount of turning changes according to the amount of tilting is thereby displayed (S12). The image of the half turned state can be generated by an ordinary method such as texture mapping of the real page onto a curved page frame or the like. Model data for such page rendering is stored in a memory within the output data generating section 110 or the like in advance.

Meanwhile, the operation description determining block 112 monitors whether or not the amount of tilting has become equal to or smaller than the second threshold value lth2 and whether or not the joystick 24 is thus returned to the neutral state. When the joystick 24 is returned to the neutral state and the tilt time thus far is within the tilt time limit Tth (Y in S14), the display switching block 116 requests the output data generating section 110 to generate an animation image such that the page that has been in the half turned state is turned completely and the next two double-spread pages appear. The output data generating section 110 generates images of the page being turned and displays the images on the display device 20 in predetermined time steps until the next two double-spread pages are displayed. The page turning processing is thereby completed (S16).

When the tilt time has exceeded the tilt time limit Tth (N in S14), on the other hand, the page that has been in the half turned state is returned to the original state (S18). Specifically, as described above, even when the tilt time exceeds the tilt time limit Tth, this processing changes the amount of turning according to the amount of tilting while the tilting is performed, and returns display to the original state when the joystick 24 is returned to the neutral state. On the other hand, in a case where the page turning is determined to be valid by the determination Y in S14, when the amount of turning of the page is decreased with decreases in the amount of tilting in a process of the joystick being returned to the neutral state before the page turning is determined to be valid, the page moves discontinuously or moves back and forth unnaturally before and after the determination.

Accordingly, only increases in the amount of tilting may be reflected in the amount of turning and the amount of turning may be prevented from decreasing with decreases in the amount of tilting until the tilt time limit has passed since detection of the start of the tilting, for example. In this case, a maximum value of the amount of tilting at the point in time is reflected in the amount of turning within the tilt time limit. Alternatively, because a time from a start of decrease in the amount of tilting to a time that the amount of tilting becomes equal to or smaller than the second threshold value is considered to be very short, the reflection of the amount of tilting in the amount of turning may be always delayed by the very short time that is roughly calculated.

Alternatively, when the amount of tilting is decreased at a predetermined speed or more or at a predetermined acceleration or more, it may be determined that the user has ended the tilting of the joystick 24 by decreasing the force of the operating finger, and the decrease in the amount of tilting may be prevented from being reflected in the amount of turning of the page. In addition, this timing may be regarded as an end point of the tilt time, and may be compared with the tilt time limit to determine whether the page turning is valid/invalid. One or a combination of these methods prevents the page from moving discontinuously or back and forth.

Figure 9:
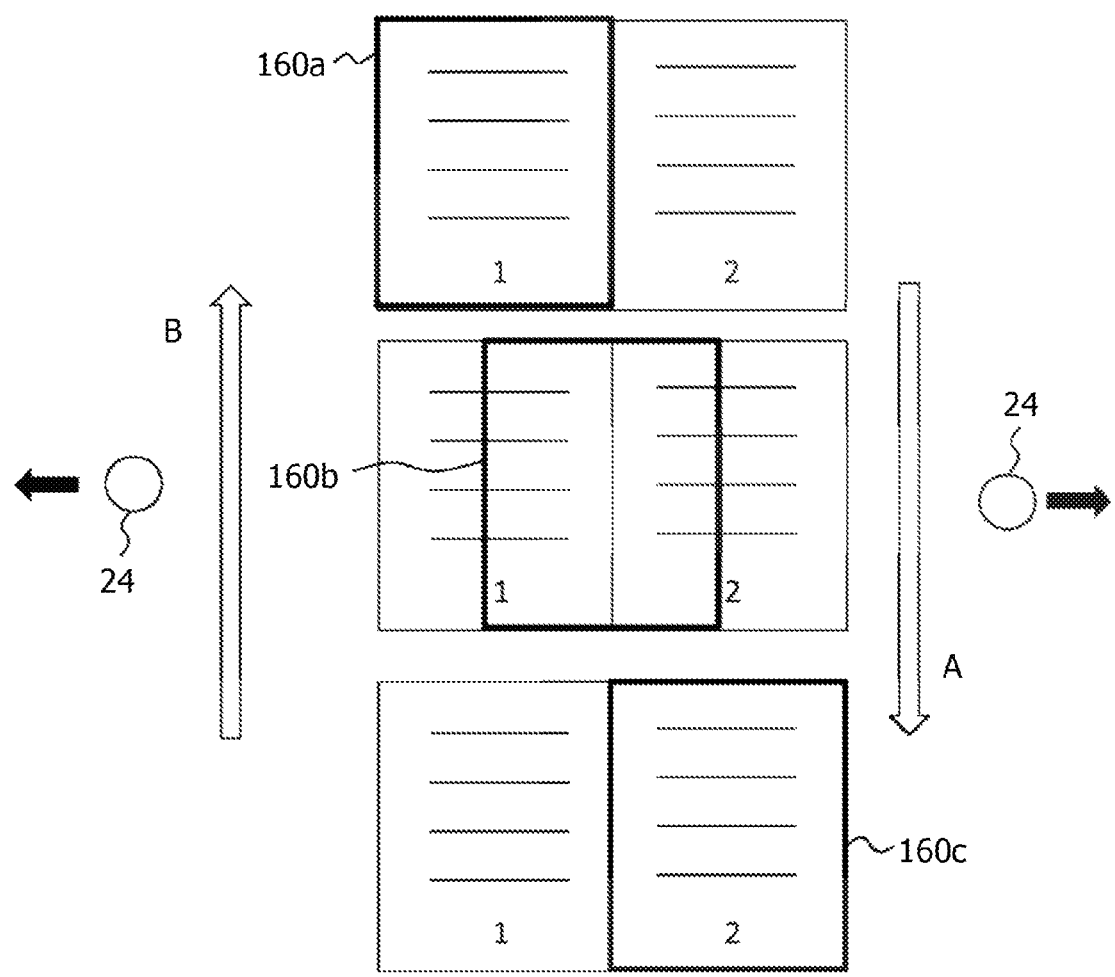
FIG. 9 is a diagram showing another example of changes in the electronic book viewing screen displayed in the present embodiment.

FIG. 9 shows another example of changes in the electronic book viewing screen displayed in the present embodiment. The figure supposes a case where the information processing device 10 is held in the portrait orientation. Regions 160a to 160c in two double-spread pages (a first page and a second page in the top row of the figure) which regions are to be displayed on the display device 20 are indicated by a thick line frame. The viewing screen of FIG. 9 shows a single set of two double-spread pages of information, where adjacent pages within the set of two double-spread pages of information are separated by a seam therebetween. The region 160a, 160b, 160c has a perimeter that defines an area smaller than an entire area of the two double-spread pages of information. When the information processing device 10 in a state of displaying a screen in the landscape orientation shown in FIG. 6, for example, is switched to the portrait orientation, the operation description determining block 112 obtains information to that effect from the motion sensor 67 or the like, and changes a screen configuration as shown in FIG. 9.

In the present example, an image of exactly one page is displayed on the screen in the portrait orientation. For example, the top row of the figure shows a state in which the whole of the first page on the left side of the double-page spread is displayed. However, the screen configuration when the information processing device 10 is held in the portrait orientation is not intended to be limited to this. For example, in a case of a book including landscape pages, one page is displayed when the information processing device 10 is held in the landscape orientation. In addition, when the aspect ratio of a page is different from the aspect ratio of the screen of the display device 20, the whole of the page may be displayed by providing a margin at the left and right or the top and bottom of the page, for example, or only a part of the page may be displayed. The present embodiment performs common processing according to the position of the display region within the pages and the tilting direction of the joystick 24 without depending on the holding orientation.

Suppose that the user tilts the joystick 24 to the right side in a state in which the whole of the first page is set as the display region 160a as shown in the top row of FIG. 9. At this time, there is room for scrolling in the tilting direction of the joystick 24, and therefore the operation description determining block 112 determines that this operation is a scrolling operation. As a result, continuing the tilting moves the display region to the right side as in the transition of an arrow A, and the scrolling eventually stops in a state in which the second page as the right side of the double-page spread is displayed (display regions 160b and 160c). When the joystick 24 is tilted to the left side in the state in which the whole of the second page thus forms the display region 160c, there is room for scrolling in the tilting direction, and it is therefore determined that this operation is also a scrolling operation.

As a result, continuing the tilting moves the display region to the left as in the transition of an arrow B, and the scrolling eventually stops in a state in which the first page as the left side of the double-page spread is displayed (display regions 160b and 160a). The aforementioned scrolling (e.g., left and right) shows that the region(s) 160a, 160b, 160c may scroll over a given one of the plurality of page sets (e.g., the first set containing pages 1 and 2) in one or more directions defined by one or more corresponding tilt directions of the joystick 24 by the user. The scrolling may also include scrolling across the respective seam such that the user may view the seam in the region 160b. Incidentally, the display region at the starting point and the end point of the scrolling may be at arbitrary positions. That is, as long as there is room for scrolling in the tilting direction, the display region is moved in the tilting direction in a period of the tilting of the joystick.

Figure 10:
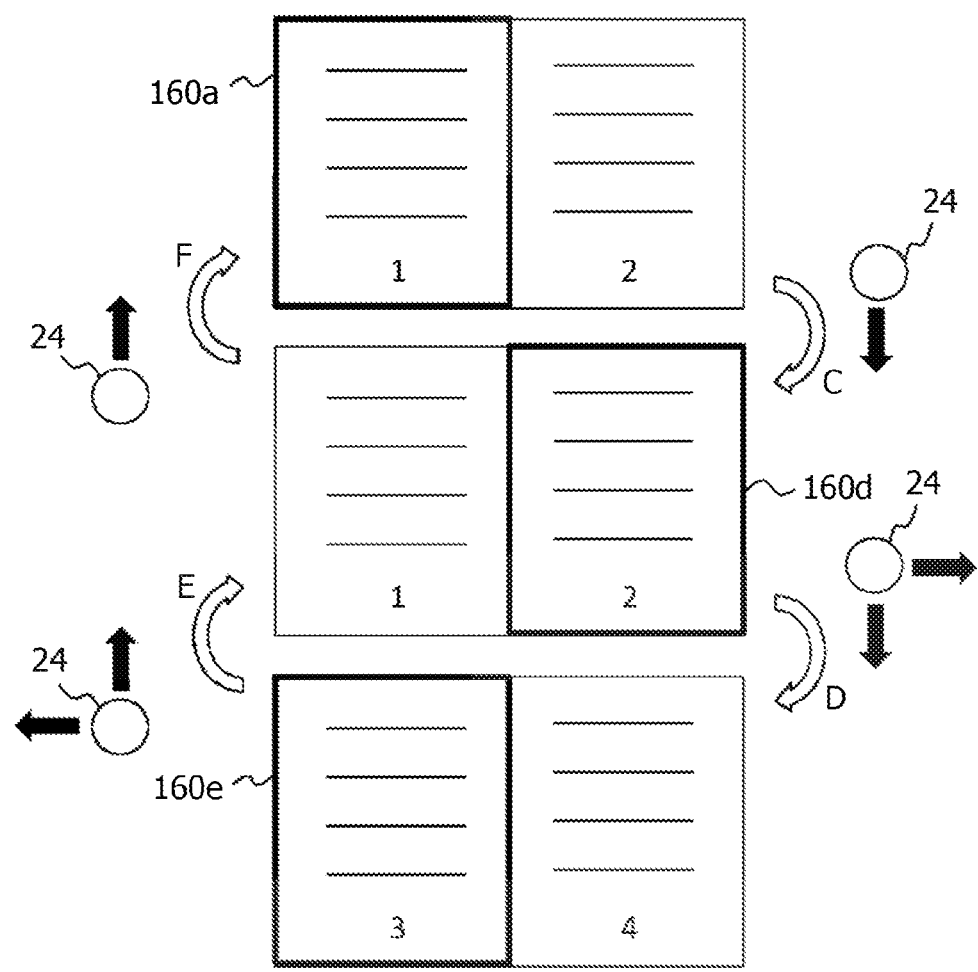
FIG. 10 is a diagram showing an example of changes in the electronic book viewing screen in a case where display region changing operation is performed in conditions similar to those of FIG. 9.

FIG. 10 shows an example of changes in the electronic book viewing screen in a case where display region changing operation is performed in conditions similar to those of FIG. 9. The top row of the figure shows the same state as shown in the top row of FIG. 9, that is, the state in which the first page as the left side of the double-page spread is displayed. The viewing screen of FIG. 10, however, shows a plurality of sets of two double-spread pages of information, a first set containing pages 1 and 2, and a second set containing pages 3 and 4, with further sets being possible (although not shown). Adjacent pages within each of the plurality of sets of two double-spread pages of information are separated by a respective seam therebetween. The region 160a, 160b, 160c has a perimeter that defines an area smaller than an entire area of the plurality of two double-spread pages of information. In addition, the viewing screen of FIG. 10 shows that adjacent ones of the plurality of sets are separated by respective edges (e.g., pages 1 and 2 of the first set are adjacent to pages 3 and 4 of the second set, and are separated by an edge). When the joystick 24 is tilted to the lower side in this state, there is no room for scrolling in the tilting direction, and therefore the operation description determining block 112 determines that this operation is a display region changing operation. As a result, the display region is switched to the second page next to the first page in the contents of the book, as in the transition of an arrow C (display region 160d).

In this case, as in the page turning operation described with reference to FIG. 7, the operation of tilting the joystick 24 and an operation of returning the joystick 24 are treated as one set of operations. That is, a start and an end of the tilting are respectively detected by using the first threshold value and the second threshold value provided for the amount of tilting, and whether the display region changing operation is valid/invalid is determined according to whether or not a tilt time between the start and the end of the tilting is within the tilt time limit. During page turning, a half turned state is produced as described above to indicate that page turning operation is in progress.

On the other hand, at the time of switching of the display region which switching does not involve page turning as in the figure, the present display region is moved by a predetermined minute amount in a direction determined to be the tilting direction of the joystick 24 until it is determined that the switching is valid. For example, when the joystick 24 is tilted to an angle range in which it is determined that the joystick 24 is on the lower side in the state of the top row of FIG. 10, the display region 160a is moved to the lower side by the minute amount. The display region 160a may be returned to the original position after the passage of a predetermined very short time since the movement. Such a configuration can indicate that the switching operation is in progress and indicate the direction determined to be the tilting direction of the joystick by the information processing device. The user can therefore confirm whether or not the tilting operation intended by the user is recognized by the information processing device. The user can control whether the switching is valid/invalid by returning the joystick 24 immediately when the switching is desired and returning the joystick 24 slowly when the switching is not desired.

When changing operation is performed again by tilting the joystick 24 to the lower side in the state of the display region 160d in the middle row of FIG. 10, the display region is switched to a third page next to the second page in the contents of the book, as in the transition of an arrow D (display region 160e). The third page is not included in the same double-spread pages as the second page. Therefore, the region of the third page in the third page and the fourth page as the next double-spread pages is displayed. In this case, however, no page turning animation is inserted, and the display region is switched as in the switching from the first page to the second page. The above description of FIG. 10 makes clear that the scrolling (e.g., left and right) as illustrated in FIG. 9 may occur in the viewing screen of FIG. 10 based on the tilting of the joystick 24 by the user. Indeed, the region(s) 160a, 160b, 160c may scroll over a given one of the plurality of page sets (e.g., the first set containing pages 1 and 2) in one or more directions defined by one or more corresponding tilt directions of the joystick 24 by the user, including across the respective seam such that the user may view the seam in the region 160b. However, the scrolling across the respective seam such that the user may view the seam in the region 160b takes place only when the scrolling and the one or more tilt directions does not indicate that any portion of the perimeter of the region(s) 160a, 160b, 160c should traverse any of the respective edges (between sets of two double-spread pages of information). In contrast, the region (e.g., region 160a) switches between adjacent pages (e.g., between page 1 and page 2), without scrolling across the seam (see transition labeled C), when: (i) at least one portion of the perimeter of the region (e.g., region 160a) is coincident with at least one of the respective edges (e.g., the edge between pages 1 and 2 of the first set, and pages 3 and 4 of the second set), and (ii) at least one of the tilt directions of the joystick 24 provided by the user indicates that the at least one portion of the perimeter of the region should traverse the at least one of the respective edges. In addition, the aforementioned switching between adjacent pages may occur between sets (e.g., see transition labeled C, switching between page 2 of the first set and page 3 of the second set) when: (i) at least one portion of the perimeter of the region (e.g., region 160*d*) is coincident with at least one of the respective edges (e.g., the edge between pages 1 and 2 of the first set, and pages 3 and 4 of the second set), and (ii) at least one of the tilt directions of the joystick 24 provided by the user indicates that the at least one portion of the perimeter of the region should traverse the at least one of the respective edges.

The display region is switched in an opposite direction when the joystick 24 is tilted to the upper side. Specifically, when changing operation is performed by tilting the joystick 24 to the upper side in the state of the display region 160*e* in the bottom row of FIG. 10, the display region is switched to the second page preceding the third page in the contents of the book, as in the transition of an arrow E (display region 160*d*). The second page is not included in the same double-spread pages as the third page. Therefore, the region of the second page in the first page and the second page as the previous double-spread pages is displayed.

When changing operation is performed again by tilting the joystick 24 to the upper side in this state, the display region is switched to the first page preceding the second page in the contents of the book, as in the transition of an arrow F (display region 160*a*). The tilting direction of the joystick 24 at the time of switching of the display region is made to coincide with a general direction of reading an article within pages forward. The user can thereby switch the display region by intuitive operation.

That is, the example of FIG. 10 is an example of a book in which an article within pages is intended to be read from the top to the bottom. It is thus possible to understand intuitively that when reading has progressed to a lower edge of a page, a part further below the page, that is, a continuation of the page will be displayed by tilting the joystick 24 downward. Hence, the tilting direction of the joystick 24 at the time of switching of the display region is not limited to an upward or downward direction, but may be changed as appropriate according to the binding of the book, the direction of reading forward, or the like.

In contrast to the display region changing operation described thus far with reference to FIG. 10, the page turning operation shown in FIG. 6 can be said to direct attention to the page itself being turned. That is, when the switching of the display region to a part beyond the turned page is considered, tilting to the right is more natural when a right page is turned, and tilting to the left is more natural when a left page is turned. Similar page turning operation is accordingly enabled also in the switching of the display region as described with reference to FIG. 10.

Specifically, in the state in which the page on the right side of the double-page spread is displayed as in the display region 160*d* in the middle row of FIG. 10, the page on the left side of the next double-spread pages is displayed as in the transition of an arrow D by tilting the joystick 24 to the right side (display region 160*e*). In this case, however, by adding an animation in which the page being displayed is turned as shown in FIG. 6, a sense of realism of turning the page is produced, and consistency with the case of FIG. 6 is achieved. Determination of whether page turning is valid/invalid for the operation of the joystick 24 is similar to that of FIG. 6.

Conversely, when the joystick 24 is tilted to the left side in the state in which the page on the left side of the double-page spread is displayed as in the display region 160*e* in the bottom row of FIG. 10, an animation of turning the page is added, and the page on the right side of the previous double-spread pages is displayed, as in the transition of an arrow E (display region 160*d*). When two kinds of operations and respective transition processes are thus prepared for switching to the same region, a more natural operation can be selected according to whether the user is conscious of the contents of the book, the page itself, or the like.

Figure 11:
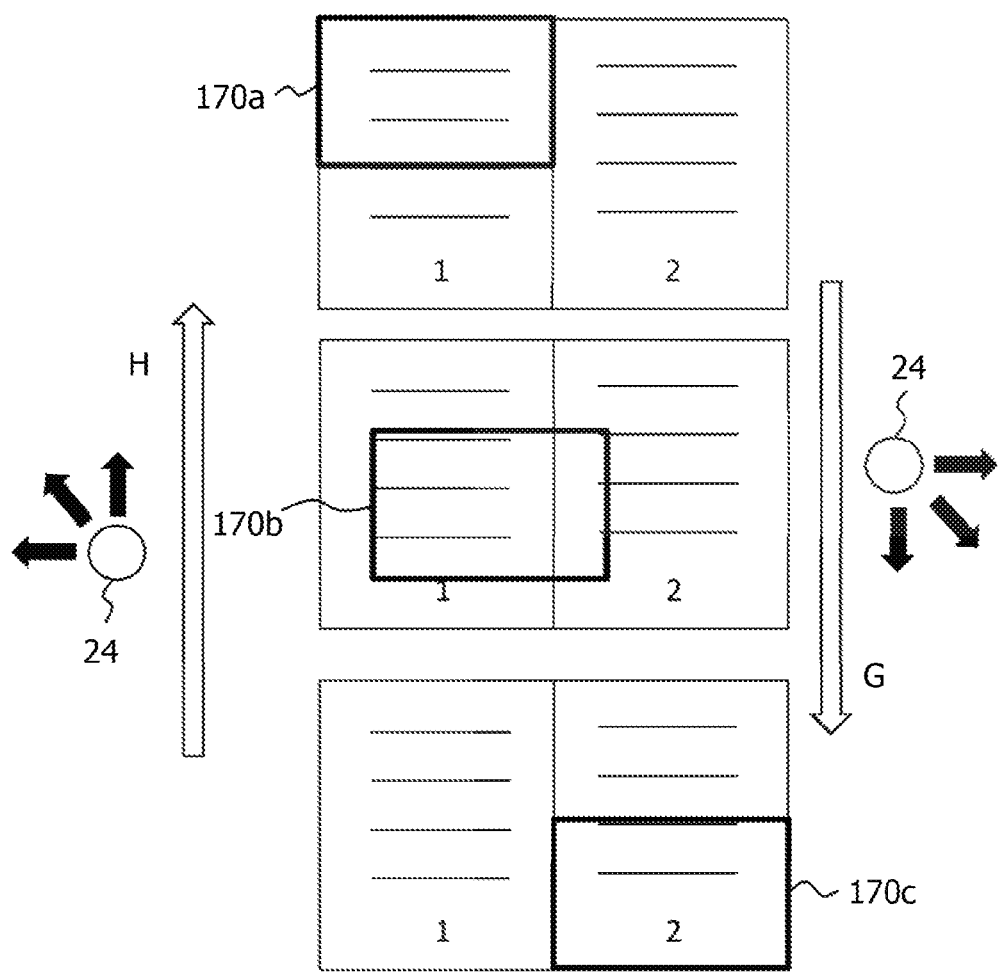
FIG. 11 is a diagram showing another example of changes in the electronic book viewing screen displayed in the present embodiment.

FIG. 11 shows another example of changes in the electronic book viewing screen displayed in the present embodiment. The figure supposes a case where the information processing device 10 is held in the landscape orientation and a page is displayed in an enlarged state. However, as described above, similar operation and similar processing are performed also in the portrait orientation. Regions 170*a* to 170*c* in two pages of a double-page spread (a first page and a second page in the top row of the figure) which regions are to be displayed on the display device 20 are indicated by a thick line frame. Of the two joysticks 24, the joystick not assigned to the switching of the display region nor the scrolling operation is tilted in a downward direction in a state in which the whole of the two double-spread pages shown in FIG. 6 is displayed, for example. Thereby, the image is enlarged, and in turn, the display region becomes a part of the pages, as shown in the figure.

The top row of the figure, for example, shows a state in which an upper half of the first page as the left side of the double-page spread is displayed. When the joystick 24 is tilted in a right downward direction in this state, for example, there is room for scrolling in the tilting direction, and therefore the operation description determining block 112 determines that this operation is a scrolling operation. As a result, continuing the tilting moves the display region in the right downward direction as in the transition of an arrow G, and eventually the scrolling stops in a state in which a lower half of the second page as the right side of the double-page spread is displayed (display regions 170*b* and 170*c*).

When the joystick 24 is tilted in a left upward direction in the state in which the lower half of the second page thus forms the display region 170*c*, there is room for scrolling in the tilting direction, and therefore it is determined that this operation is also a scrolling operation. As a result, continuing the tilting moves the display region in the left upward direction as in the transition of an arrow H, and eventually the scrolling stops in the state in which the upper half of the first page as the left side of the double-page spread is displayed (display regions 170*b* and 170*a*). Also in this case, the display region at the starting point and the end point of the scrolling may be at arbitrary positions. In addition, the scrolling direction may be arbitrary as long as there is room for scrolling in that direction. That is, the scrolling direction can be freely designated by the tilting direction of the joystick 24.

Figure 12:
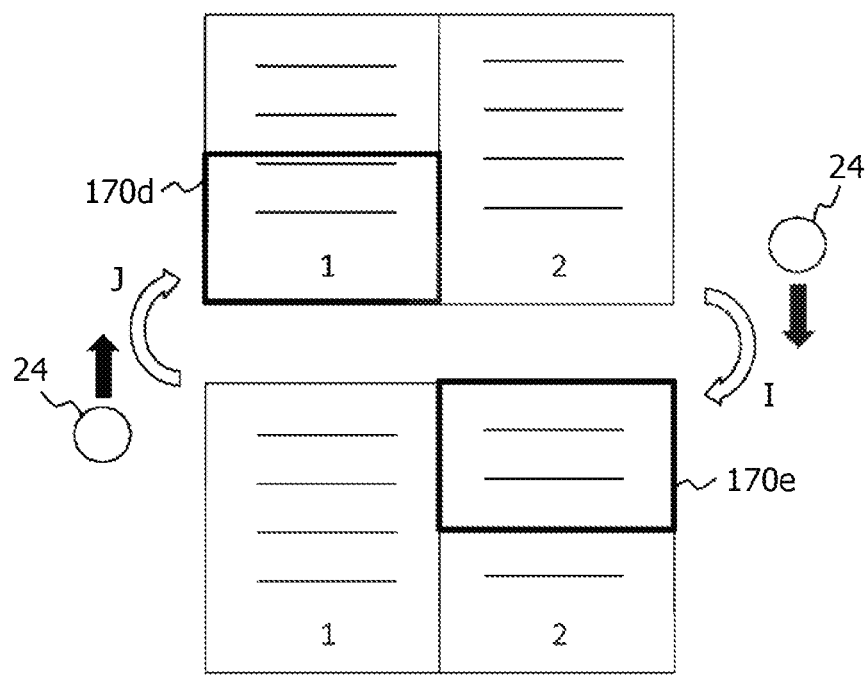
FIG. 12 is a diagram showing an example of changes in the electronic book viewing screen in a case where display region changing operation is performed in conditions similar to those of FIG. 11.
Figure 13:
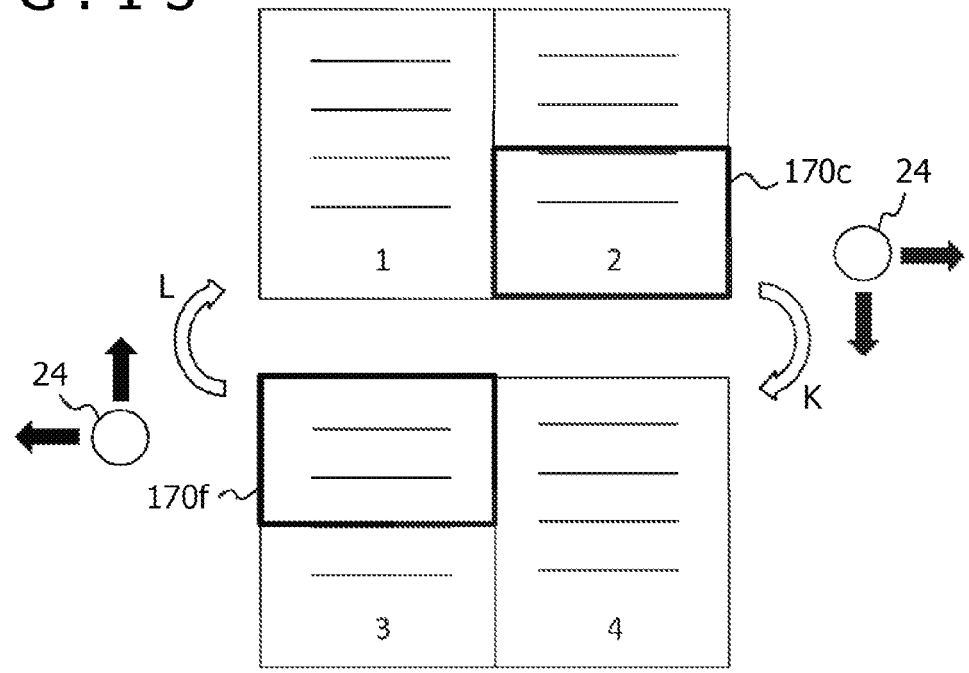
FIG. 13 is a diagram showing another example of changes in the electronic book viewing screen in a case where display region changing operation is performed in conditions similar to those of FIG. 11.

FIGS. 12 and 13 show an example of changes in the electronic book viewing screen when display region changing operation is performed in conditions similar to those of FIG. 11. The top row of FIG. 12 shows a state in which the lower half of the first page as the left side of the two double-spread pages is displayed. This state is a result of scrolling the display region 170*a* in the top row of FIG. 11 by tilting the joystick 24 to the lower side, for example. Incidentally, at a point in time that the lower edge of the display region coincides with the lower edge of the page, there is no room for scrolling, and therefore the scrolling stops irrespective of the tilting of the joystick 24.

When the joystick 24 is newly tilted to the lower side in this state, there is no room for scrolling in the tilting direction, and therefore the operation description determining block 112 determines that this operation is a display region changing operation. As a result, the display region is switched to the upper half of the second page next to the first page in the contents of the book, as in the transition of an arrow I (display region 170e). This processing is basically similar to that described with reference to FIG. 10 except for the size of the display region. Hence, an operating method and determination of whether the display region changing operation is valid/invalid may also be similar. In addition, as described with reference to FIG. 10, in a stage before it is determined that the switching is valid, the display region is moved by a minute amount in a direction determined to be the tilting direction of the joystick 24, or to the lower side in the present example.

Conversely, when a changing operation is performed by tilting the joystick 24 to the upper side in the state of the display region 170e in the bottom row of FIG. 12, the display region is switched to the lower half of the first page preceding the second page in the contents of the book, as in the transition of an arrow J (display region 170d).

The top row of FIG. 13 shows the same state as the screen shown in the bottom row of FIG. 11, and displays the lower half of the second page as the right side of the double-page spread. When the joystick 24 is tilted to the lower side in this state, there is no room for scrolling in the tilting direction, and therefore the display region is switched to the upper half of the third page next to the second page in the contents of the book, as in the transition of an arrow K (display region 170f). The third page is not included in the same double-spread pages as the second page. Thus, the upper half region of the third page in the third page and the fourth page as the next double-spread pages is displayed.

When the joystick 24 is tilted to the upper side, the display region is switched in the opposite direction. That is, when a changing operation is performed by tilting the joystick 24 to the upper side in the state of the display region 170f in the bottom row of FIG. 13, the display region is switched to the lower half of the second page preceding the third page in the contents of the book, as in the transition of an arrow L (display region 170c). The second page is not included in the same double-spread pages as the third page. Thus, the lower half region of the second page in the first page and the second page as the previous double-spread pages is displayed. Also at the time of switching to thus different pages, the display region is moved by a minute amount in the direction determined to be the tilting direction of the joystick 24, that is, in a downward direction or an upward direction, in a stage before it is determined that the switching is valid.

Even in cases where a part of a page is thus displayed, display region changing operation by tilting the joystick 24 upward or downward and page turning operation by tilting the joystick 24 to the left or to the right are both allowed as described with reference to FIG. 10. Specifically, when the joystick 24 is tilted to the right side in the state in which the lower half of the page on the right side of the double-page spread is displayed as in the display region 170c in the top row of FIG. 13, an animation of turning the page on the right side is inserted, and the upper half of the page on the left side of the next double-spread pages is displayed (display region 170f). Conversely, when the joystick 24 is tilted to the left side in the state of the display region 170f in the bottom row, an animation of turning the page is inserted, and the lower half of the page on the right side of the previous double-spread pages is displayed (display region 170c).

Modes in which scrolling operation, display region changing operation, and page turning operation are realized by one joystick 24 have been described above in a few examples. A policy thereof is common roughly as follows.
(1) Including a case where the whole of a double-page spread is displayed, when the joystick is tilted in a direction in which there is no room for scrolling because the display region is in contact with an edge of a page, display is switched to a previous or subsequent region continuous with the present display region in the contents of the book according to the tilting direction
(2) In the conditions of the above-described (1), when the display region after the switching is not present within double-spread pages currently set as a display object, the display object is also switched to previous or subsequent double-spread pages where the display region is present
(3) In the conditions of the above-described (2), when the tilting direction of the joystick is parallel with the opening (horizontal or vertical) of the pages, a page turning animation is added, and then the next region is displayed
(4) In states other than (1), free scrolling is performed according to the tilting direction
However, an exception such as not receiving operations of the joystick 24 under a certain condition or the like may be provided as appropriate according to the contents of the book, the intention of a writer of the contents, or the like.

Figure 14:
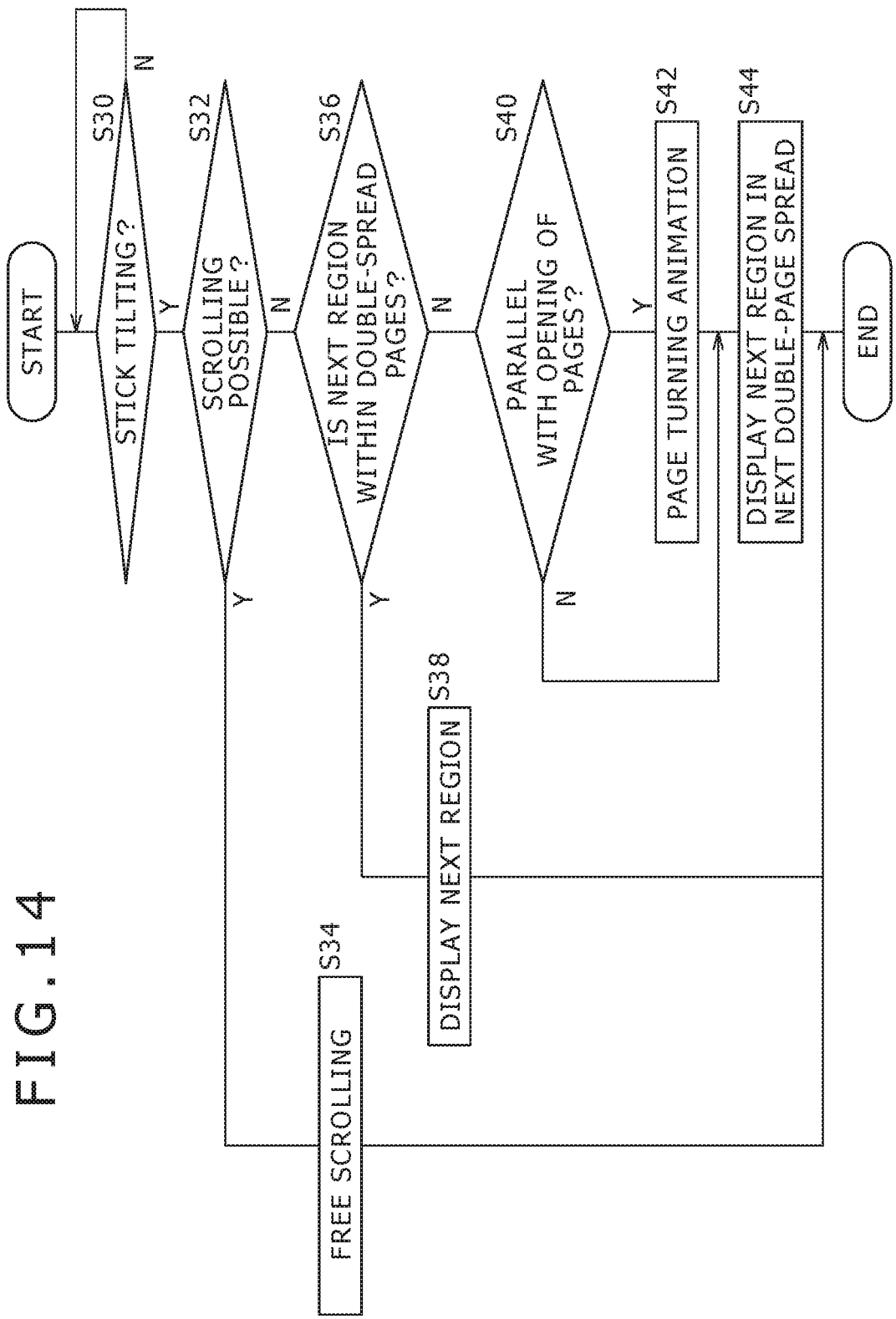
FIG. 14 is a flowchart showing a processing procedure for realizing various kinds of operations by a joystick in the present embodiment.

Description will next be made of operation of the information processing device that can be realized by the constitution described above. FIG. 14 is a flowchart showing a processing procedure for realizing various kinds of operations by the joystick 24 in the present embodiment. Incidentally, the present flowchart comprehensively illustrates processing involved in screen changes in FIG. 6 and FIGS. 9 to 13. In addition to this, processing according to an operation of enlarging or reducing a page image and a change in the holding orientation of the information processing device 10 (the landscape orientation or the portrait orientation) may be performed as appropriate. In addition, suppose that processing of determining the validity of operation on the basis of a tilt time limit as shown in FIG. 8 is performed for display region switching and page turning operation.

First, the operation description determining block 112 of the display screen control section 104 obtains information related to the amount of tilting and tilting direction of the joystick 24 from the operation receiving section 102, and detects a start of tilting by monitoring whether or not the amount of tilting has exceeded the first threshold value lth1 (S30). When tilting is not started, the processing waits in that state (N in S30). When a start of tilting is detected (Y in S30), on the other hand, whether or not there is room for scrolling in the tilting direction is determined (S32).

When there is room for scrolling (Y in S32), the scroll processing block 114 scrolls the screen in the same direction as the tilting direction (S34). The display region is thereby moved as shown in FIG. 9 or FIG. 11. At this time, scrolling speed may be changed according to the amount of tilting. When there is no room for scrolling in the tilting direction of the joystick 24 (N in S32), on the other hand, the display region switching section 116 performs display region switching processing. Specifically, determination is made of whether or not a previous or subsequent region (expressed as a "next region" in the figure) continuous with the present display region in the contents of the book is present within double-spread pages set as a display object at the time point in question (S36). When the corresponding region is present within the double-spread pages (Y in S36), display is switched to the region (S38).

When the next region is not present within the double-spread pages (N in S36), on the other hand, whether or not the tilting direction of the joystick 24 is parallel with the opening of the pages is determined (S40). For example, as described above, in the case of a horizontal double-page spread, whether or not the tilting is in the horizontal direction is determined. When the tilting direction of the joystick 24 is parallel with the opening of the pages (Y in S40), an animation in which the page present in the tilting direction is turned is inserted (S42), and then display is switched to the next region in double-spread pages after the turning (expressed as a next double-page spread in the figure) (S44). When the tilting direction is not parallel with the opening of the pages (N in S40), display is directly switched to the next region in the next double-spread pages (S44).

According to the present embodiment described above, when contents including data of a plurality of pages such as an electronic book or the like are displayed, free scrolling of the screen, switching of the display region, and switching of pages as a display object are realized by one joystick. In this case, the characteristics of the joystick that allows a plurality of parameters such as a tilting direction, a tilt angle, a tilt time, and the like to be inputted by easy operations are utilized. For example, an operation rule that the user can intuitively understand is provided for the position of the display region within pages and the tilting direction of the joystick, and the processing is branched.

In addition, the tilt time limit is provided to determine whether an operation is valid/invalid. Thus, whether to confirm or cancel the operation can be determined in the middle of the operation. In addition, an intermediate stage in which a page is set in a half turned state or the screen is moved by a minute amount in a direction determined to be the tilting direction of the joystick is provided to serve as a basis for determining whether or not to confirm display region switching. These configurations make it possible to perform various operations without the trouble of moving a finger to another operating means for each type of operation or without a need to remember correspondences between operating means and operation descriptions. Thus, an easy and user-friendly user interface can be realized.

The same operations are made possible by another operating means such as a touch pad or the like together with operations using such a joystick. The user can thereby select suitable operating means according to the situation of the user or the preferences of the user. When scrolling operation or the like is performed on the touch pad disposed on the screen of the display device, for example, it may be difficult to see the screen hidden by the hand of the user, or the user may be worried about making the touch pad dirty with fingerprints. Such problems can be overcome easily by using the joystick.

The present invention has been described above on the basis of embodiment thereof. The foregoing embodiment is illustrative, and it is to be understood by those skilled in the art that combinations of constituent elements and processing processes of the embodiments are susceptible of various modifications and that such modifications also fall within the scope of the present invention.

REFERENCE SIGNS LIST

10 Information processing device, 20 Display device, 21 Front touch pad, 24 Joystick, 60 CPU, 62 GPU, 64 Main memory, 66 Storage, 67 Motion sensor, 70 Operating section, 100 Control unit, 102 Operation receiving section, 104 Display screen control section, 108 Book data storage section, 110 Output data generating section, 112 Operation description determining block, 114 Scroll processing block, 116 Display switching block.

INDUSTRIAL APPLICABILITY

As described above, the present invention is applicable to information processing devices such as computers, information terminals, electronic book readers, game machines, and the like.

The invention claimed is:

1. An information processing device comprising:
    a display screen control section operating to generate data for displaying a region of a plurality of sets of two double-spread pages of information on a display screen for a user, where the region has a perimeter that defines an area smaller than an entire area of the plurality of two double-spread pages of information, where adjacent pages within each of the plurality of two double-spread pages of information are separated by a respective seam, and adjacent ones of the plurality of sets are separated by respective edges; and
    an operation receiving section receiving an operation of tilting a joystick by the user,
    wherein the display screen control section operates such that:
    the region scrolls over a given one of the plurality of page sets in one or more directions defined by one or more corresponding tilt directions of the joystick by the user, including across the respective seam such that the user may view the seam in the region, so long as the scrolling and the one or more tilt directions does not indicate that any portion of the perimeter of the region should traverse any of the respective edges, and
    the region switches between adjacent pages when: (i) at least one portion of the perimeter of the region is coincident with at least one of the respective edges, and (ii) at least one of the tilt directions of the joystick provided by the user indicates that the at least one portion of the perimeter of the region should traverse the at least one of the respective edges.

2. The information processing device according to claim 1, wherein the display screen control section operates such that:
    the region switches between adjacent pages when: (i) at least one portion of the perimeter of the region is coincident with at least one of the respective edges, (ii) at least one of the tilt directions of the joystick provided by the user indicates that the at least one portion of the perimeter of the region should traverse the at least one of the respective edges, (iii) a tilt time from a start of the tilting of the joystick to an end of the tilting of the joystick in the at least one of the tilt directions of the joystick is within a predetermined tilt time limit, and (iv) the tilt time does not exceed the tilt time limit.

3. The information processing device according to claim 1, wherein the display screen control section operates to produce an animation simulating a turning of a page in a physical book for display to the user in the region at least one of prior to and during the switching between adjacent pages of information.

4. The information processing device according to claim 3, wherein when two adjacent edges of the perimeter of the region are coincident with two adjacent respective edges of one of the plurality sets, the display screen control section determines whether or not to produce the animation as a function of which of the two adjacent respective edges the at least one of the tilt directions of the joystick provided by the user indicates that the region should traverse.

5. The information processing device according to claim 3, wherein during a period during which the joystick is tilted, the display screen control section displays a state in a middle of page turning while changing an amount of turning of the page according to an amount of tilting.

6. The information processing device according to claim 1, wherein the display screen control section operates such that the region moves by a predetermined minute amount in a direction corresponding to the at least one of the tilt directions of the joystick provided by the user, followed by switching between adjacent pages when: (i) at least one portion of the perimeter of the region is coincident with at least one of the respective edges, (ii) at least one of the tilt directions of the joystick provided by the user indicates that the at least one portion of the perimeter of the region should traverse the at least one of the respective edges, and (iii) an end of the tilting is reached.

7. An information processing method comprising:
generating data for displaying a region of a plurality of sets of two double-spread pages of information on a display screen for a user, where the region has a perimeter that defines an area smaller than an entire area of the plurality of two double-spread pages of information, where adjacent pages within each of the plurality of two double-spread pages of information are separated by a respective seam, and adjacent ones of the plurality of sets are separated by respective edges;
receiving an operation of tilting a joystick by the user;
scrolling the region over a given one of the plurality of page sets in one or more directions defined by one or more corresponding tilt directions of the joystick by the user, including across the respective seam such that the user may view the seam in the region, so long as the scrolling and the one or more tilt directions does not indicate that any portion of the perimeter of the region should traverse any of the respective edges, and
switching the region between adjacent pages when: (i) at least one portion of the perimeter of the region is coincident with at least one of the respective edges, and (ii) at least one of the tilt directions of the joystick provided by the user indicates that the at least one portion of the perimeter of the region should traverse the at least one of the respective edges.

8. A non-transitory, computer readable storage medium containing a computer program for a computer, which when executed by the computer causes the computer to execute actions, comprising:
generating data for displaying a region of a plurality of sets of two double-spread pages of information on a display screen for a user, where the region has a perimeter that defines an area smaller than an entire area of the plurality of two double-spread pages of information, where adjacent pages within each of the plurality of two double-spread pages of information are separated by a respective seam, and adjacent ones of the plurality of sets are separated by respective edges;
receiving an operation of tilting a joystick by the user;
scrolling the region over a given one of the plurality of page sets in one or more directions defined by one or more corresponding tilt directions of the joystick by the user, including across the respective seam such that the user may view the seam in the region, so long as the scrolling and the one or more tilt directions does not indicate that any portion of the perimeter of the region should traverse any of the respective edges, and
switching the region between adjacent pages when: (i) at least one portion of the perimeter of the region is coincident with at least one of the respective edges, and (ii) at least one of the tilt directions of the joystick provided by the user indicates that the at least one portion of the perimeter of the region should traverse the at least one of the respective edges.

* * * * *